United States Patent [19]
Shan

[11] Patent Number: 5,590,142
[45] Date of Patent: Dec. 31, 1996

[54] MODE-LOCKED FIBRE RING LASER STABILIZATION

[75] Inventor: Xuekang Shan, Ipswich, England

[73] Assignee: British Telecommunications public limited company, London, England

[21] Appl. No.: 403,717

[22] PCT Filed: Feb. 23, 1994

[86] PCT No.: PCT/GB94/00355

§ 371 Date: Mar. 14, 1995

§ 102(e) Date: Mar. 14, 1995

[87] PCT Pub. No.: WO94/19847

PCT Pub. Date: Sep. 1, 1994

[30] Foreign Application Priority Data

Feb. 25, 1993 [EP] European Pat. Off. .............. 93301413

[51] Int. Cl.$^6$ .................................................. H01S 3/098
[52] U.S. Cl. ................................. 372/18; 372/29; 372/94; 372/38; 372/26
[58] Field of Search .................................... 372/6, 18, 29, 372/32, 94

[56] References Cited

PUBLICATIONS

Shan et al, Electronics Letters, vol. 29, No. 11, 27 May 1993, Enage GB, pp. 978–981, "Novel Method To Suppress Noise in Harmonically modelocked Erbium Fibre Lasers".

Shan et al, "Stabilising Er Fibre Soliton Laser With Pulse Phase Locking", Electronics Letters, vol. 28, No. 2, 16 Jan. 1992, Enage GB, pp. 182–184.

Sabert et al, "Spatial Hole Burning in Nd3+ Fiber Lasers Suppressed by Push–Pull Phase Modulation", Applied Physics Letters, vol. 58, No. 21, 27 May 1991, New York US, pp. 2323–2325.

Harvey et al, "Harmonically Mode–Locked Fiber Ring Laser with an Internal Fabry–Perot Stabilizer for Soliton Transmission", Optics Letters, vol. 18, No. 2, 15 Jan. 1993, New York, pp. 107–109.

Vanherzeele, "Characterization and Active Stabilization of a Harmonically Modulated Continuous–Wave Nd:LiYF4 Laser", Review of Scientific Instruments, vol. 60, No. 4, Apr. 1989, New York, pp. 592–597.

Danielmeyer et al, "Spontaneous Single Frequency Output From a Spatially Homogeneous Nd:YAG Laser", Applied Physics Letters, vol. 16, No. 3, 1 Feb. 1970, New York, pp. 124–126.

Danielmeyer "Stable Tunable Single–Frequency Nd:YAG Laser", Applied Physics, vol. 3, 1974, Heidelberg DE, pp. 193–198.

*Primary Examiner*—Leon Scott, Jr.
*Attorney, Agent, or Firm*—Nixon & Vanderhye P.C.

[57] ABSTRACT

A method is described of stabilizing the output of a mode-locked fibre ring laser (1). The fibre constituting the laser (1) includes a dopant in its core. The method comprises the steps of adjusting the length of the ring laser (1) to minimise variations in its cavity length, and hence lock the phase of the laser output pulses with that of its drive source (2), and subjecting a portion (1a) of the fibre of the ring laser (1) to vibrations at a predetermined frequency whose period is less than the dopant ion upper state lifetime.

16 Claims, 4 Drawing Sheets

INSTRUMENT NOISE FLOOR

MODE-LOCKED FIBRE RING LASER STABILIZATION

BACKGROUND OF THE INVENTION

1. Field of the Invention

This invention relates to a method of, and apparatus for, stabilising the output of a mode-locked fibre ring laser, and to a mode-locked fibre ring laser.

2. Related Art

Mode-locked fibre ring lasers offer potentially the best quality (pulse width, pulse shape and time x bandwidth) optical source for producing solutions. A fibre laser typically needs to contain tens or even hundreds of meters of fibre for two reasons: to obtain sufficient gain from the rare-earth-doped fibre, and also to include all required intra-cavity components to enable controlled operation. The fundamental frequency of a laser cavity of this length is in the MHz region. Hence, to use a fibre laser as a source of optical pulses at GHz frequencies (the range of most interest to communications systems at present), it is necessary to achieve stable operation at very high harmonics of the fundamental cavity frequency. This requires active control of the length of the fibre laser. Mode-locking at high harmonics, and the susceptibility of fibre to its environment, lead to output noise and instability, unless unwanted cavity modes can be suppressed and the cavity length kept at the right value. Harmonically mode-locked lasers behave quite differently from fundamentally mode-locked lasers; and, generally speaking, their output is inherently noisier. This is due to supermode competitions associated with harmonic mode-locking. The reasons for this will now be explained.

Thus, in an Nth harmonic mode-locked laser, the cavity mode spacing is $f_c$, and the modulation frequency $f_m=Nf_c$. An axial mode is not locked to its nearest neighbors, but to the ones N axial modes apart on each side. All the modes within the linewidth are thus grouped into N sets, or into N so-called supermodes. Every supermode forms a separate mode-locking solution, and satisfies all the modulation and lasing conditions. As a result, all these modes can oscillate at the same time more or less independently and compete against each other, unless one of them, for some reason, saturates the gain and thus suppresses the others. The energy shift among these supermodes, and the relative phase slides between them, readily leads to pulse amplitude fluctuations and even to missing of some pulses. Reflections (e.g. from intracavity elements) into the gain medium (erbium fibre in this case) affects the mode competition, as they form standing waves in the lasing medium, and thus cause spatial hole boring. In simple erbium fibre ring laser operations, sporadic noise bursts, which are related to supermode beatings in the laser's radio frequency (RF) spectrum, are observed. Letting only one supermode oscillate is the key to the stable operation of such lasers.

An effective way to suppress the unwanted supermodes is (see "Harmonically mode-locked fiber ring laser with an internal Fabry-Perot stabilizer for solution transmission"- Optics Letters, vol. 18, No. 2 Jan. 1993) to insert a high finesse Fabry-Perotetalon into the fibre cavity, the etalon having a free spectral range which is exactly equal to the pulse repetition rate. The etalon acts as a very narrow band-pass comb filter, and so picks up only one supermode. The intra-cavity etalon needs careful control, and a separate cavity length adjustment is still required.

SUMMARY OF THE INVENTION

The present invention provides a method of stabilising the output of a mode-locked fibre ring laser, the fibre constituting the laser including a dopant in its core, the method comprising the steps of adjusting the length of the ring laser to minimise variations in its cavity length, and hence lock the phase of the laser output pulses with that of its drive source, and subjecting a portion of the fibre of the ring laser to vibrations at a predetermined frequency whose period is less than the dopant ion upper state lifetime.

Advantageously, the length of the ring laser is adjusted by means of a piezoelectric device, the ring laser is mode-locked by a modulator driven by a synthesizer, and the piezoelectric device is driven by a feedback circuit which compares the phase of the laser output signal with the phase of the synthesizer and outputs an error signal which drives the piezoelectric device to minimise the deviation of the phase of the laser output from its desired value.

Preferably, a frequency mixer is used to compare the phase of the laser output signal and the phase of the synthesizer, and a tone generator is included in the feedback circuit between the mixer and the piezoelectric device, the tone generator or being effective to subject said fibre portion to vibrations at said predetermined frequency. The tone generator or may superimpose a tone of a second predetermined frequency into the feedback circuit, the second predetermined frequency being such that the first-mentioned predetermined frequency is equal to, or a harmonic of, the second predetermined frequency.

The invention also provides apparatus for stabilising the output of a mode-locked fibre ring laser, the fibre constituting the laser including a dopant in its core, the apparatus comprising means for adjusting the length of the ring laser to minimise variations in its cavity length, and hence lock the phase of the laser output pulses with that of its drive source, and means for subjecting a portion of the fibre of the ring laser to vibrations at a predetermined frequency whose period is less than the dopant ion upper state lifetime.

Advantageously, a piezoelectric device constitutes the means for adjusting the length of the ring laser, and the apparatus further comprises a modulator and a synthesizer, the synthesizer driving the modulator to mode-lock the ring laser.

Preferably, the apparatus further comprises a feedback circuit for driving the piezoelectric device to adjust the length of the ring laser, the feedback circuit comparing the phase of the laser output signal with the phase of the synthesizer and outputting an error signal which drives the piezoelectric device to minimise the deviation of the phase of the laser output from its desired value. Conveniently, the feedback circuit includes a frequency mixer for comparing the phase of the laser output signal and the phase of the synthesizer.

In a preferred embodiment, the apparatus further comprises a tone generator for superimposing a signal of a second predetermined frequency into the feedback circuit downstream of the mixer, the tone generator constituting the means for subjecting said fibre portion to vibrations at said predetermined frequency. Advantageously, the tone generator is such that the first-mentioned predetermined frequency is equal to, or harmonic of, the second predetermined frequency.

The invention on further provides a mode-locked fibre ring laser comprising a fibre ring laser, an optical pump source for driving the ring laser, means for mode-locking the output of the ring laser, and apparatus for stabilising the output of the ring laser, the fibre constituting the ring laser including a dopant in its core, the mode-locking means being constituted by a modulator positioned within the ring laser, and the modulator being driven by a synthesizer, wherein means are provided for adjusting the length of the ring laser to minimise variations in its cavity length, and hence lock the phase of the laser output pulses with that of the drive source, and wherein the stabilising apparatus is as defined above.

Preferably, a laser diode constitutes the optical pump source.

BRIEF DESCRIPTION OF THE DRAWINGS

The invention will now be described in greater detail, by way of example, with reference to the accompanying drawings, in which.

DETAILED DESCRIPTION OF EXEMPLARY EMBODIMENTS

Figure 1:
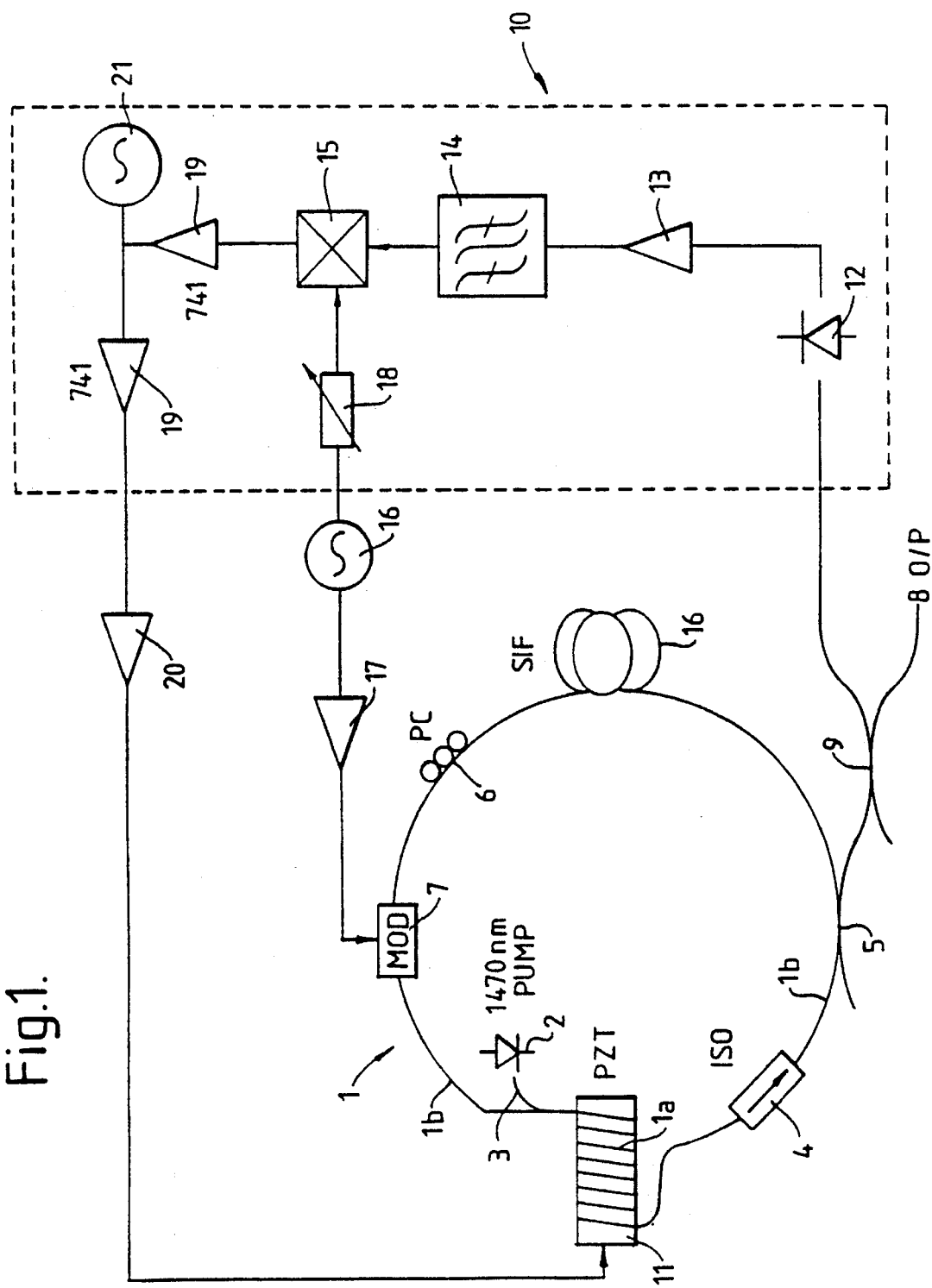
FIG. 1 is a circuit diagram of the mode-locked fibre ring laser stabilization scheme of the invention.

Referring to the drawings, FIG. 1 shows a fibre ring laser 1 constituted by 30 m of erbium fibre 1a and 70 m of step index fibre (SIF) 1b having a dispersion of 16 ps/nm/km at 1560 nm. The total cavity length of the laser 1 is, therefore, 100 m; and this corresponding to a cavity mode spacing of about 2 MHz. The SIF 1b ensures that the peak optical power of the laser 1 is close to the fundamental solution power in the fibre, resulting in more stable operation.

The fibre ring laser 1 is pumped by a 1470 nm laser diode 2 via a coupler 3. An isolator 4 is provided in the ring laser 1 between the erbium fibre 1a and an output coupler 5, to minimise the effect of reflection from the output end and ensure unidirectional operation. If the laser 1 was allowed to work in both directions, its output would tend to incorporate instabilities. A polarisation controller 6 is also provided in the ring laser 1. The output of the laser is mode locked by means of an electro-optic (a lithium niobate) phase modulator 7 having an insertion loss of ~6 dB and a 3 dB bandwidth of ~2.5 GHz. The modulator 7 is, therefore, effective to mode-lock the laser 1 at ~2.5 GHz, which is about the 1250th harmonic of the fundamental cavity frequency. The polarisation controller 6 is required as the modulator 7 is polarisation sensitive.

The output coupler 5 is a 50/50 coupler, this coupler leading to the laser output 8 via a further coupler 9. The coupler 9 is a 90/10 coupler, with 90% of its input leading to the laser output 8, and 10% leading to a stability circuit indicated generally by the reference numeral 10. Stabilisation of the output of the laser 1 is necessary, because of its susceptibility to mechanical vibrations and temperature variations which affect its cavity length, and hence the mode-locking process. Stabilisation is affected by a piezoelectric drum 11 which is driven by the circuit 10 so as to maintain the cavity length of the laser 1 substantially constant. The erbium fibre 1a is would around the drum 11. The stabilising circuit 10 includes a PIN diode 12 (a BT&D 20 GHz PIN diode) which converts The optical signal thereto into an electrical output signal. This electrical signal is amplified by an Avantek 6 GHz, 20 dB gain amplifier 13, and is then passed to a Watkins Johnson M15C frequency mixer 15 via a Declan BA 2488-50 bandpass filter 14 filter having a pass band of 50 MHz centred on a frequency of 2.488 GHz).

The modulator 7 is driven by a synthesizer 16 via an RF amplifier 17. The synthesizer 16 is an HP83620A device, and the RF amplifier 17 is a Minicircuit Laboratories ZHL-1042J. The output of the synthesizer 16 is also passed to the mixer 15, via a delay line 18. The mixer 15 compares the phase $\theta_p(t)$ of the laser output pulse with the phase $\theta_d$ the synthesizer output, and outputs an error signal u(t), where:

$$u(t)=Ky_dy_p(t) \cos [\theta_d-\theta_p(t)+\psi]$$

when $Y_d$ and $y_p(t)$ are the inputs to the mixer from the synthesizer 16 and the laser 1 respectively, K is the conversion constant of the mixer, and $\psi$ is introduced by the adjustable delay line 18. The length of the delay line 18 is adjusted to ensure that the two signals input into the mixer 15 are in phase, that is to say $$\theta_d+\psi=\pi/2$$

When the pulse is best, $\theta_p(t) \sim 0$ and the mixer output then is:

$$u(t)=Ky_dy_p(t) \sin \theta_p(t)$$

which is clearly a good error signal for small deviations of $\theta_p(t)$.

The output of the mixer 15 is fed, via two 741 op-amps 19 and a high voltage amplifier 20 to the piezoelectric drum 11, thus forming a negative feedback loop which is effective to displace the drum to adjust the length of the fibre ring to keep the deviation $\theta_p(t)$ at a minimum value. In this way, the fibre cavity length is maintained at the desired level, and optical pulses can last for hours in contrast to only the few minutes that are possible without the feedback.

Figure 2A:
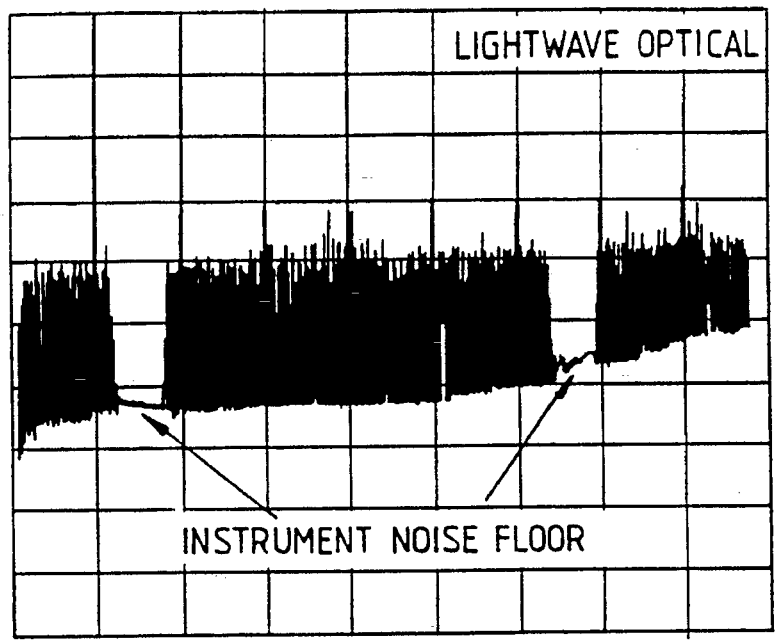
FIG. 2a to 2d are RF spectra of the laser mode-locked at 2.5 GHz and illustrate the stabilising effect of the scheme of FIG. 1 on the laser output.

The stabilistation circuit 10 as described above is known (see "Stabilising Er Fibre Soliton Laser With Pulse Phase Locking"—Electronics Letters 16 Jan. 1992, Vol. 28 No. 2 pages 182–183). Unfortunately, as explained above, unwanted cavity mode beatings (caused by supermode competition) occur. These unwanted beatings (see FIGS. 2a and 2b) are spaced 2 MHz apart and overlay the desired beatings which are ~2.5 GHz apart. They contribute to the pulsed optical output of the laser 1 simply as noise. For FIG. 2a: RL 2.50 dBm, Atten. 15 dB, 5.00 dB/DIV, AVG, PWR. ~1.2 dBm, REFERENCE LEVEL 2.5 dBm, CENTER 11.00 GHz, SPAN 22.00 GHz, RB 1.00 MHz, VB 3.00 KHz, and ST 22.00 sec.

Figure 2B:
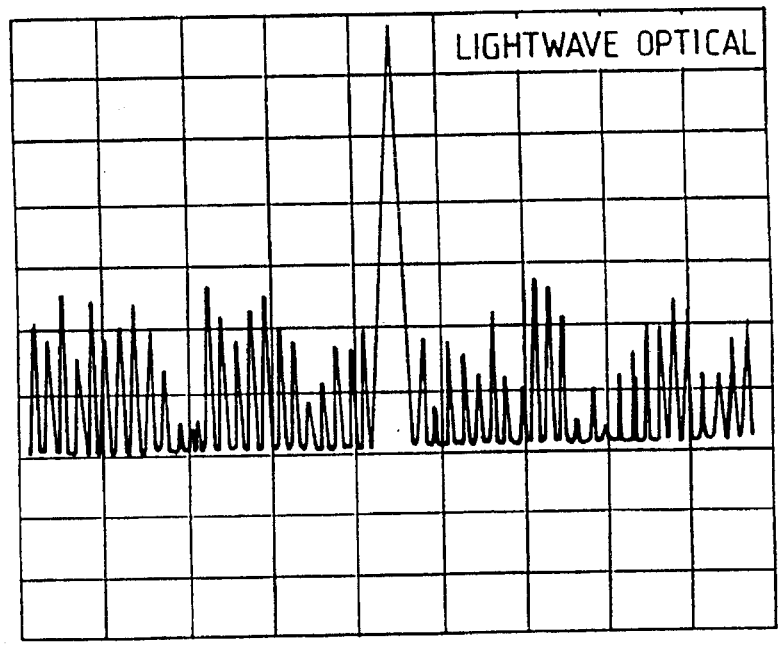

For FIG. 2b: RL 2.50 dBm, ATTEN. 15 dB, 5.00 dB/DIV, AVG. PWER. ~1.2 dBm, RES BANDWIDTH 300 kHz, CENTER 2.5016 GHz, SPAN 100.0 GHz, ±RB 300 kHz, ±VB 3.00 kHz, ST 333.3 m sec.

Figure 2C:
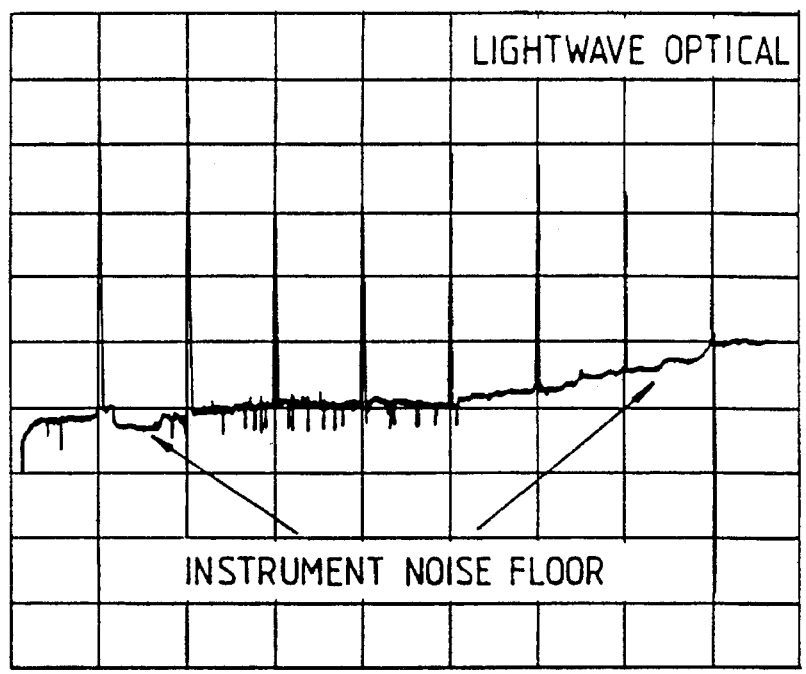
Figure 2D:
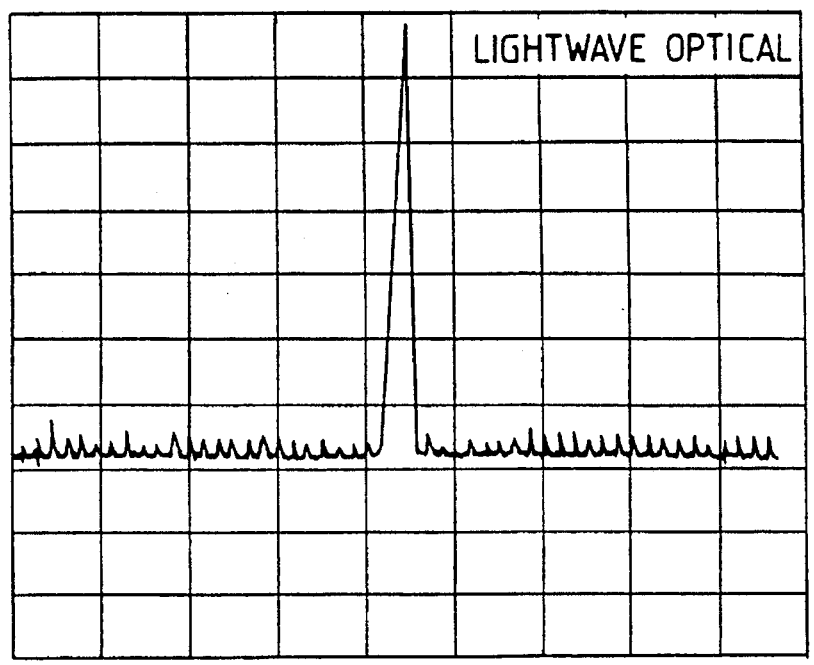
Figure 3A:
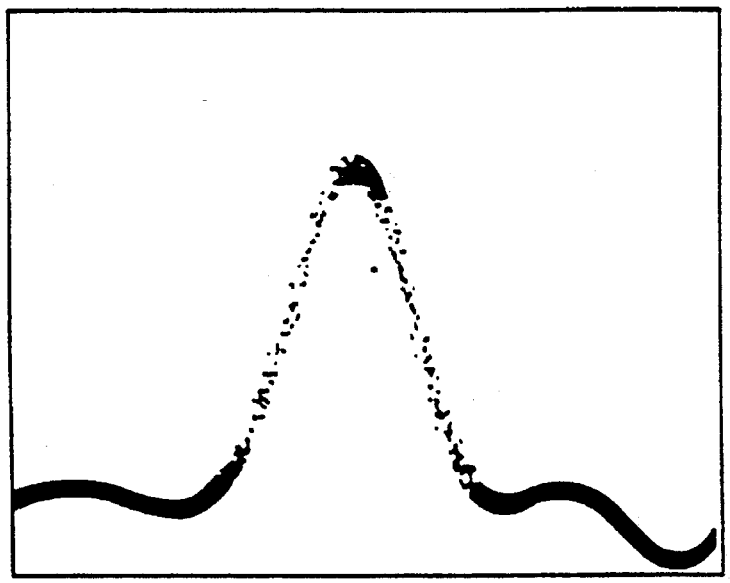
FIG. 3 compares an optical pulse (as observed with a fast pin/sampling scope) from the laser when utilising the scheme of FIG. 1 and when not utilising that scheme.
Figure 3B:
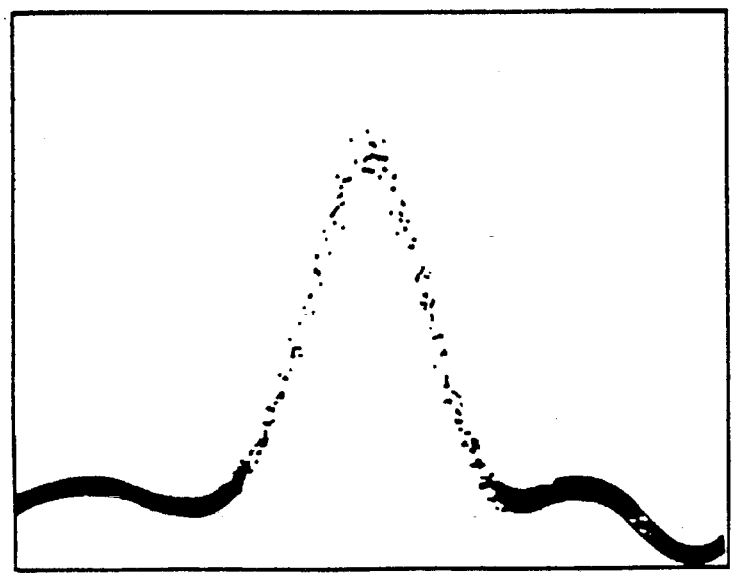

In order to suppress the sporadic bursts caused by these unwanted beatings the known stabilisation circuit is modified by the inclusion of a tone generator 21. The tone generator produces a signal of ~14 KHz, which is mixed with the error signal output by the mixer 15 downstream of the first op-amp 19. As shown in FIGS. 2c and 2d, the effect of the tone signal is to remove substantially all the noise by suppressing the supermode bearings (the 2 MHz components) by more than 10 dB (optical power), so that the dominant supermode is more than 25 dB higher than the unwanted supermodes. For FIG. 2c: RL 2.50 dBm, ATTEN, 15 dB, 5.00 dB/DIV, AVG, PWR. ~1.2 dBm, RES. BANDWIDTH 300 kHz, CENTER 2.5016 GHz, SPAN 100.0 MHZ, ±RB 300 kHz, ±VB 3.00 kHz, ST 333.3 M sec. In this connection, FIG. 2c should be compared with FIG. 2a and FIG. 2d should be compared with FIG. 2b; from which it will be noted that, when the tone is not present, the dominant supermode is only 15 to 20 dB higher than the unwanted supermodes. FIG. 3 illustrates the improvement which results from using the known stabilisation circuit with (see FIG. 3a) and without (see FIG. 3b) the tone. As will be apparent, when the tone is present, the optical pulse output by the ring laser 1 is much cleaner.

The optimum tone frequency for the laser 1 described above (that is to say one which is mode-locked at ~2.5 GHz) has been found empirically to be ~14 kHz, which corresponds to a mechanical resonance of the piezoelectric drum 11 used, the drum actually vibrating at 28 kHz (the second harmonic of the optimum tone frequency). With the tone optimised, the laser 1 generates pulses with ~20 ps full width half maximum (FWHM) at ~2.5 GHz, the time-bandwidth product is ~0.4, and the pulse-to-pulse timing jitter is ~1 ps as measured with an HP digitising scope. Soliton data can be transmitted over 205 km fibre, using this laser as the source, with not a single error being detected within 100 minutes, giving a BER better than $10^{-13}$. It is also possible to transmit solitons generated by this laser in a recirculating loop, and to achieve a $10^{-9}$ bit error rate at 12,000 km, this being the limit imposed by Gordon-Haus jitter. In either case, when the tone is switched off (or its frequency is tuned away from the resonance), the transmissions suffer from sporadic noise bursts, and long term (minutes) error-free operation is impossible.

How the tone leaves only one supermode oscillating and suppresses the others is not fully understood, though it is believed that, when several supermodes are present, there is a standing wave pattern in the gain medium caused by weak reflections in the ring cavity due to the presence of the modulator 7 and the isolator 4. This standing wave pattern causes spatial hole burning which reduces cross-mode saturation and so affects mode competition. As a result, it is difficult for any one supermode to saturate the gain, and more supermodes are likely to be present. The tone, however, shakes (dithers) the erbium fibre at a rate (frequency) whose period is much less than the erbium ion upper state lifetime (~10 ms), thus preventing the standing wave pattern from being formed, and thereby washing out spatial hole burning (but there are still reflections). The faster the shake compared to the erbium life time, the more effective the suppression. The fastest possible rate for the particular HV amp/PZT combination is ~28 kHz.

I claim:

1. A method of stabilizing the output of a mode-locked fibre ring laser including a dopant in its core, the method comprising the steps of:

adjusting the length of the ring laser to minimize variations in its cavity length, and hence phase-lock laser output pulses with that of a drive source, and subjecting a portion of the fibre of the ring laser to vibrations at a predetermined frequency whose period is less than the dopant ion upper state lifetime.

2. A method as in claim 1, wherein the length of the ring laser is adjusted by means of a piezoelectric device.

3. A method as in claim 2, wherein the ring laser is mode-locked by a modulator driven by a synthesizer, and wherein the piezoelectric device is driven by a feedback circuit which phase-compares the laser output signal with the synthesizer and outputs an error signal which drives the piezoelectric device to minimize phase-deviation of the laser output from a desired value.

4. A method as in claim 3, in which:

a frequency mixer is used to phase-compare the laser output signal and the synthesizer, and a tone generator is included in the feedback circuit between the frequency mixer and the piezoelectric device, the tone generator being effective to subject said fibre portion to vibrations at said predetermined frequency.

5. A method as in claim 4, in which:

the tone generator superimposes a tone of a second predetermined frequency into the feedback circuit, the second predetermined frequency being such that the predetermined frequency of vibrations is equal to or a harmonic of, the second predetermined frequency.

6. Apparatus for stabilizing the output of a mode-locked fibre ring laser including a dopant in its core, the apparatus comprising:

means for adjusting the length of the ring laser to minimize variations in its cavity length, and hence phase-lock the laser output pulses with that of a drive source, and means for subjecting a portion of the fibre of the ring laser to vibrations at a predetermined frequency whose period is less than the dopant ion upper state lifetime.

7. Apparatus as in claim 6, wherein a piezoelectric device constitutes the means for adjusting the length of the ring laser.

8. Apparatus as in claim 7, further comprising:

a modulator and a synthesizer, the synthesizer driving the modulator to mode-lock the ring laser.

9. Apparatus as in claim 8, further comprising:

a feedback circuit for driving the piezoelectric device to adjust the length of the ring laser, the feedback circuit phase-comparing the laser output signal with the synthesizer and outputting an error signal which drives the piezoelectric device to minimize phase-deviation of the laser output from a desired value.

10. Apparatus as in claim 9, wherein the feedback circuit includes a frequency mixer for phase-comparing the laser output signal and the synthesizer.

11. Apparatus as in claim 10, further comprising:

a tone generator for superimposing a signal of a second predetermined frequency into the feedback circuit downstream of the frequency mixer, the tone generator constituting the means for subjecting said fibre portion to vibrations at said predetermined frequency.

12. Apparatus as in claim 11, wherein the tone generator is such that the predetermined frequency of vibrations is equal to, or harmonic of, the second predetermined frequency.

13. A mode-locked fibre ring laser comprising:

a fibre ring laser, an optical pump source for driving the ring laser, means for mode-locking the output of the ring laser, means for stabilizing the output of the ring laser, the fibre constituting the ring laser including a dopant in its core, the means fox mode-locking being constituted by a modulator positioned within the ring laser, the modulator being driven by a synthesizer, means for adjusting the length of the ring laser to minimize variations in its cavity length, and hence phase-lock the laser output pulses with the optical pump source, and wherein the means for stabilizing comprises apparatus as claimed in claim 7.

14. A ring laser as in claim 13, wherein a laser diode constitutes the optical pump source.

15. A method of stabilizing a mode locked ring fiber laser that has an optical path which includes an optical fiber with a dopant ion therein excitable to an upper state with a given lifetime in order to render the fiber optically active for laser action, the path being configured in a ring with a path length which is susceptible to change, and drive means operative cyclically to develop laser output pulses with a phase relationship that is dependent on the phase of the drive means, and with a stability dependent on the length of the path, the method including:

adjusting the length of the path so as to minimize variations in its length and thereby lock the phase of the output pulses to the phase of the drive means; and subjecting a portion of the ring to vibrations at a frequency whose period is less than the dopant ion upper state lifetime.

16. A method of stabilizing an harmonically mode locked laser that has an optical path which includes an optically active region for laser action, the path having a length which is susceptible to change, and drive means operative cyclically to promote supermode oscillation and thereby develop laser output pulses from the waveguide path with a phase relationship that is dependent on the phase of operation of the drive means and with a supermode stability dependent on the length of the path, the method including:

adjusting the length of the path so as to minimize variations in its length and thereby lock the phase of the output pulses to the phase of the drive means; and subjecting a portion of the optical path to vibrations at a frequency whose period is selected to promote a predetermined supermode and suppress others to stabilize said oscillation.

\* \* \* \* \*